(12) United States Patent
Phillip

(10) Patent No.: US 10,619,799 B1
(45) Date of Patent: Apr. 14, 2020

(54) LIGHT BULB PROJECTOR

(71) Applicant: Steven Phillip, Nantucket, MA (US)

(72) Inventor: Steven Phillip, Nantucket, MA (US)

( * ) Notice: Subject to any disclaimer, the term of this patent is extended or adjusted under 35 U.S.C. 154(b) by 0 days.

(21) Appl. No.: 16/417,809

(22) Filed: May 21, 2019

(51) Int. Cl.
*F21V 8/00* (2006.01)
*F21K 9/232* (2016.01)

(52) U.S. Cl.
CPC ............ *F21K 9/232* (2016.08); *G02B 6/0001* (2013.01)

(58) Field of Classification Search
CPC .............................. F21K 9/232; G02B 6/0001
See application file for complete search history.

(56) References Cited

U.S. PATENT DOCUMENTS

| | | | |
|---|---|---|---|
| 1,928,407 A | 9/1933 | Batchelor | |
| 2,520,513 A | 8/1950 | Sereno | |
| 5,132,589 A | 7/1992 | Friedman | |
| D540,976 S | 4/2007 | Tournas et al. | |
| 2012/0081005 A1* | 4/2012 | Lin ................... | H05B 33/0803 315/86 |
| 2013/0070440 A1* | 3/2013 | Levermore ............... | F21V 9/08 362/84 |
| 2014/0247596 A1 | 9/2014 | Scianna et al. | |
| 2017/0038031 A1* | 2/2017 | Chien ....................... | F21V 5/00 |
| 2019/0120450 A1* | 4/2019 | Chien ..................... | F21V 17/02 |
| 2019/0253670 A1* | 8/2019 | Chien .................... | H04N 5/247 |

FOREIGN PATENT DOCUMENTS

WO 2016131418 8/2016

* cited by examiner

*Primary Examiner* — Donald L Raleigh
(74) *Attorney, Agent, or Firm* — Kyle A. Fletcher, Esq.

(57) ABSTRACT

The light bulb projector is a projection device. The light bulb projector is a light bulb that is modified to project an image on a surface. The light bulb projector is reconfigurable such that the image projected by the light bulb projector can be changed between uses of the light bulb projector. The light bulb projector comprises a transparent housing, a plurality of gobos, and an illuminating circuit. The illuminating circuit generates the illumination to project the image. The transparent housing is a transparent structure that encloses the illuminating circuit. The plurality of gobos attaches to the transparent housing. Each of the plurality of gobos contains an image. Each of the plurality of gobos is an optical device that focuses and modifies the illumination generated by the illuminating circuit such that the light bulb projector projects the image associated with each gobo attached to the transparent housing.

18 Claims, 4 Drawing Sheets

LIGHT BULB PROJECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments and optics including optical elements, more specifically, a light guide configured for use with a lighting device. (G02B6/0001)

SUMMARY OF INVENTION

The light bulb projector is a projection device commonly referred to as a projector. The light bulb projector is a light bulb that is modified to project an image on a surface. The light bulb projector is reconfigurable such that the image projected by the light bulb projector can be changed between uses of the light bulb projector. The light bulb projector comprises a transparent housing, a plurality of gobos, and an illuminating circuit. The illuminating circuit generates the transparent structure that encloses the illuminating circuit. The plurality of gobos attaches to the transparent housing. Each of the plurality of gobos contains an image. Each of the plurality of gobos is an optical device that focuses and modifies the illumination generated by the illuminating circuit such that the light bulb projector projects the image associated with each gobo attached to the transparent housing.

These together with additional objects, features and advantages of the light bulb projector will be readily apparent to those of ordinary skill in the art upon reading the following detailed description of the presently preferred, but nonetheless illustrative, embodiments when taken in conjunction with the accompanying drawings.

In this respect, before explaining the current embodiments of the light bulb projector in detail, it is to be understood that the light bulb projector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the light bulb projector.

It is therefore important that the claims be regarded as including such equivalent construction insofar as they do not depart from the spirit and scope of the light bulb projector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
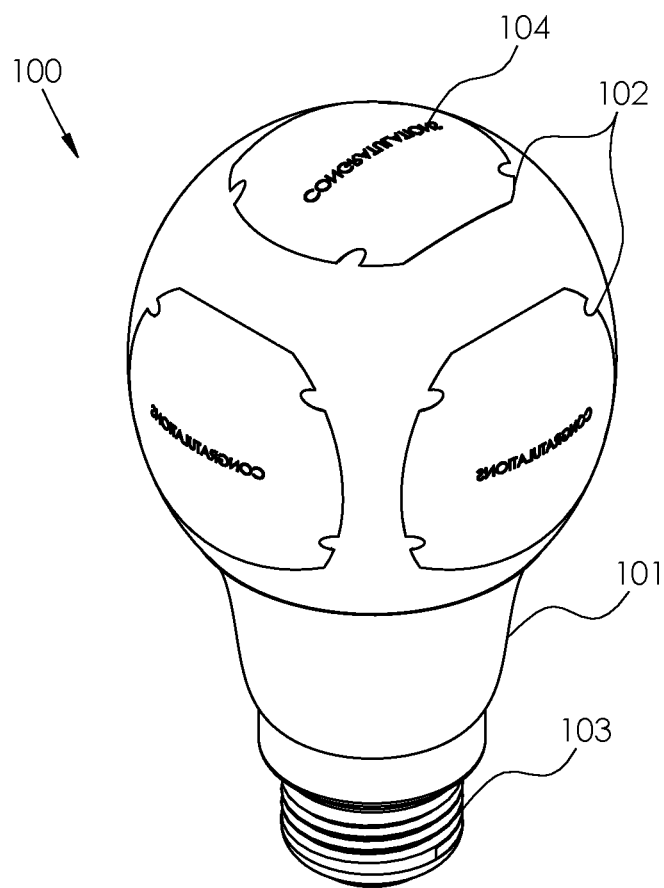
FIG. 1 is a perspective view of an embodiment of the disclosure.
Figure 2:
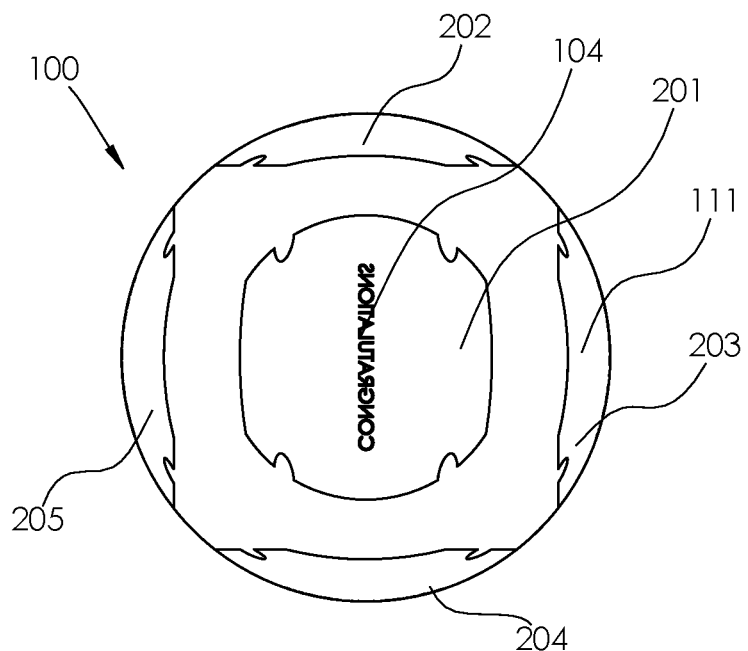
FIG. 2 is a top view of an embodiment of the disclosure.
Figure 3:
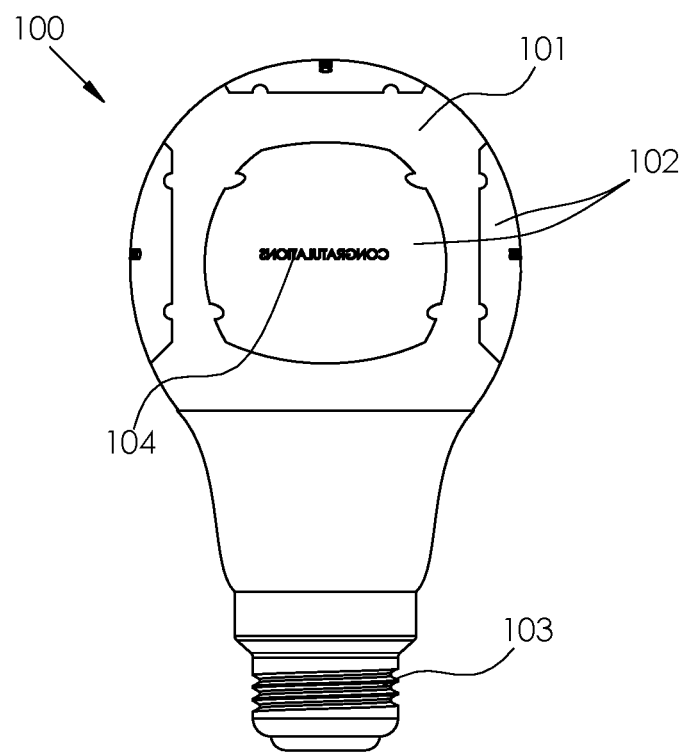
FIG. 3 is a front view of an embodiment of the disclosure.
Figure 4:
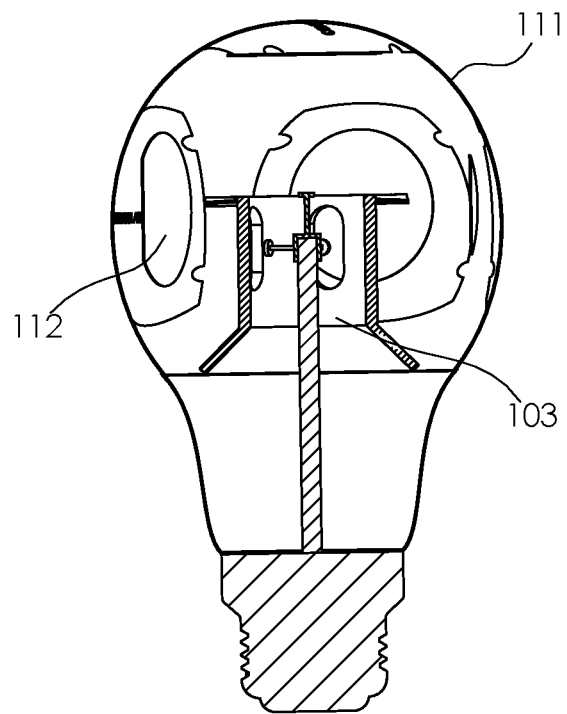
FIG. 4 is a cross-sectional front view of an embodiment of the disclosure.
Figure 5:
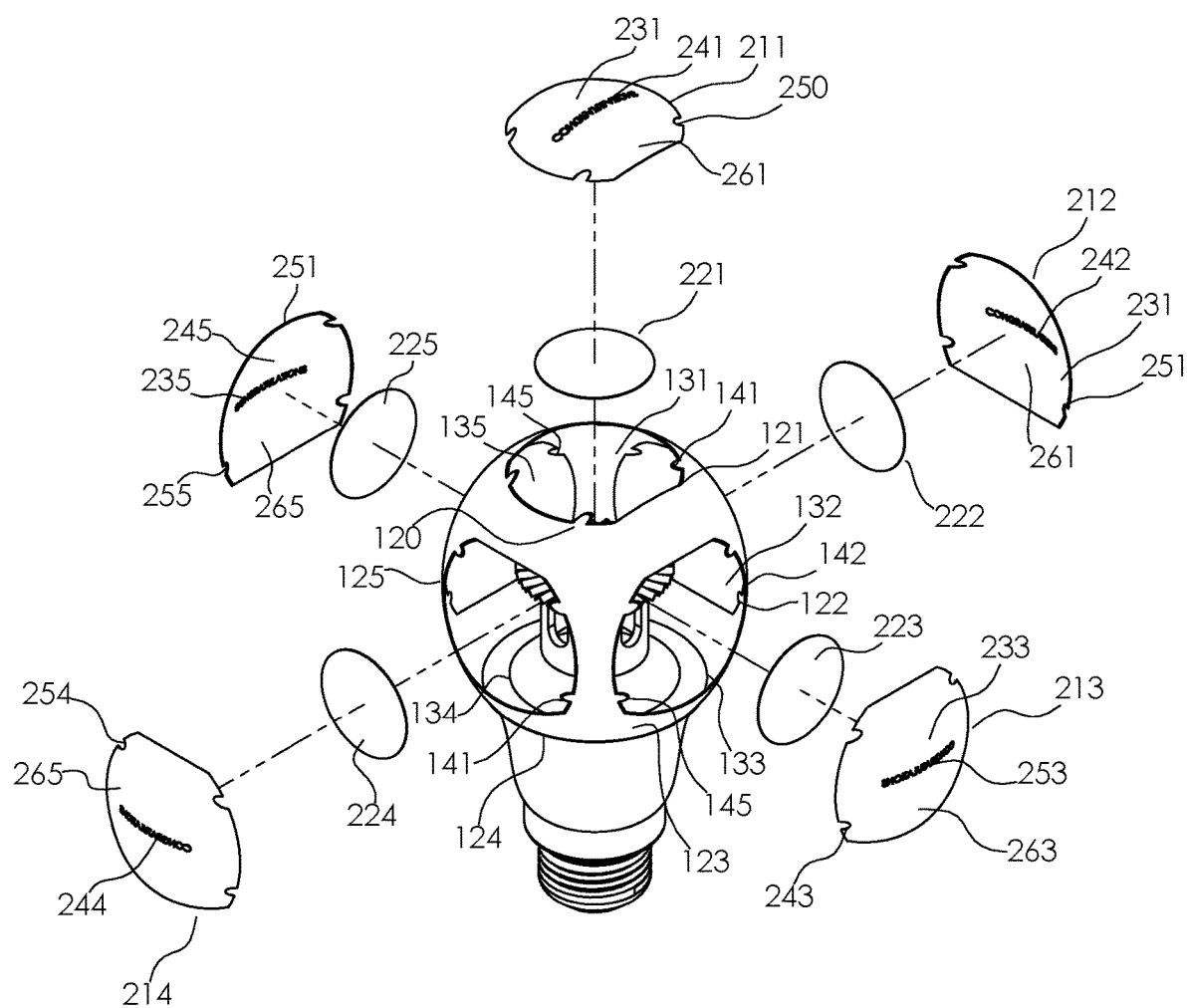
FIG. 5 is an exploded view of an embodiment of the disclosure.
Figure 5:
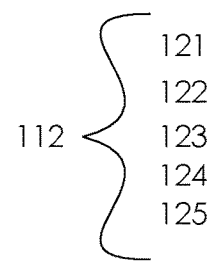
Figure 6:
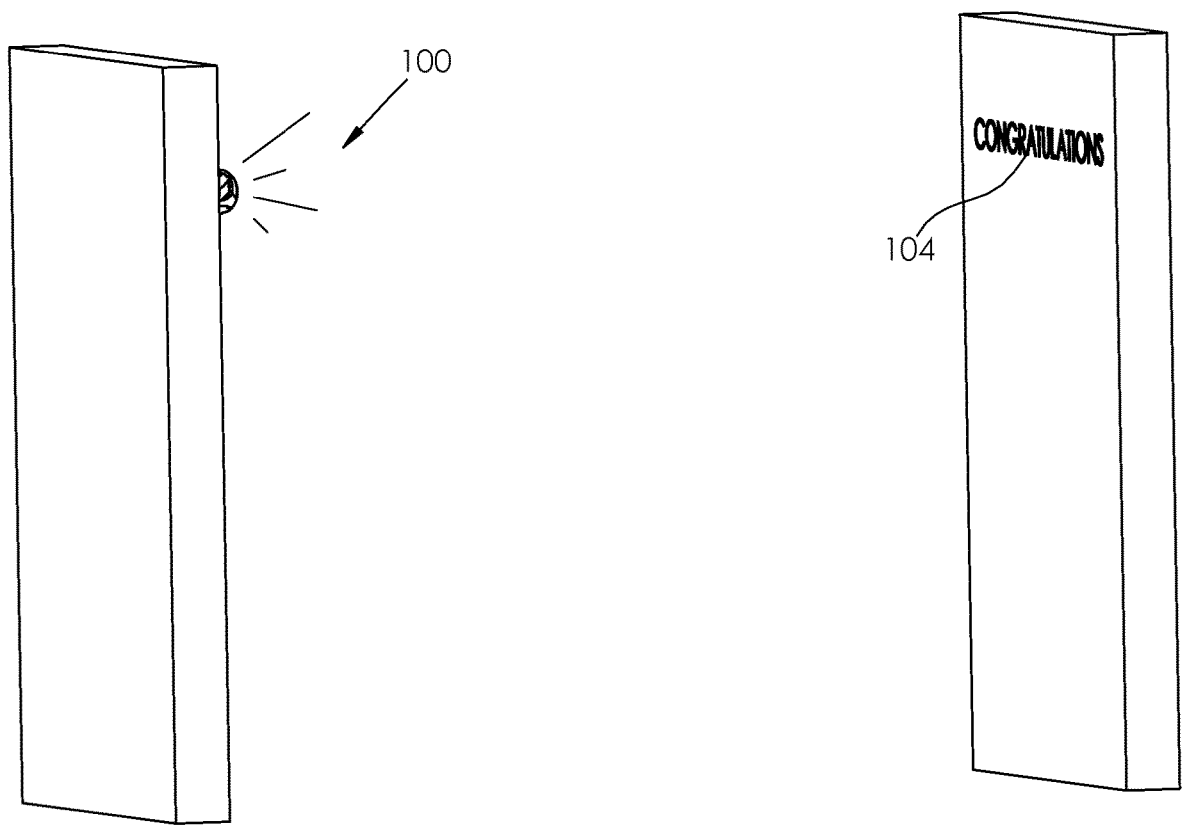
FIG. 6 is an in-use view of an embodiment of the disclosure.

Detailed reference will now be made to one or more potential embodiments of the disclosure, which are illustrated in FIGS. 1 through 6.

The light bulb projector 100 (hereinafter invention) is a projection device commonly referred to as a projector. The invention 100 is a light bulb that is modified to project an image 104 on a surface. The invention 100 is reconfigurable such that the image 104 projected by the invention 100 can be changed between uses of the invention 100. The image 104 is defined elsewhere in this disclosure.

The invention 100 comprises a transparent housing 101, a plurality of gobos 102, and an illuminating circuit 103. The illuminating circuit 103 generates the illumination to project the image 104. The transparent housing 101 is a transparent structure that encloses the illuminating circuit 103. The plurality of gobos 102 attaches to the transparent housing 101. Each of the plurality of gobos 102 contains an image 104. Each of the plurality of gobos 102 is an optical device that focuses and modifies the illumination generated by the illuminating circuit 103 such that the invention 100 projects the image 104 associated with each gobo attached to the transparent housing 101.

The illuminating circuit 103 is an electrical circuit. The illuminating circuit 103 generates the illumination that is used to project the image 104 contained in each of the plurality of gobos 102. The illuminating circuit 103 is compatible with an Edison screw such that the illuminating circuit 103 is compatible with a standard residential lighting fixture.

The transparent housing 101 is a hollow transparent structure. The transparent housing 101 is a non-Euclidean structure. The transparent housing 101 contains the illuminating circuit 103. The transparent nature of the transparent housing 101 is such that the illumination generated by the illuminating circuit 103 passes through the transparent housing 101. The plurality of gobos 102 attach to the transparent housing 101. The illumination generated by the illuminating circuit 103 passes through the transparent housing 101 and through the plurality of gobos 102 to project the image 104 associated with each of the plurality of gobos 102 on a surface. The transparent housing 101 comprises a transparent shell 111 and a plurality of gobo apertures 112.

The transparent shell 111 is a hollow non-Euclidean structure. The transparent shell 111 is a transparent structure. The transparent shell 111 forms the primary portions of the exterior surface of the transparent housing 101. The transparent shell 111 encloses the illuminating circuit 103.

Each of the plurality of gobo apertures 112 is a negative space that is formed into the exterior surface of the transparent shell 111. Each of the plurality of gobo apertures 112 is a non-Euclidean structure. Each of the plurality of gobo apertures 112 has a form factor that receives a gobo selected from the plurality of gobos 102. Each of the plurality of gobo apertures 112 has a non-Euclidean disk shape. Each gobo selected from the plurality of gobos 102 removably attaches to a gobo aperture selected from the plurality of gobo apertures 112. The plurality of gobo apertures 112 comprises a first gobo aperture 121, a second gobo aperture 122, a third gobo aperture 123, a fourth gobo aperture 124, and a fifth gobo aperture 125.

The first gobo aperture 121 is a gobo aperture selected from the plurality of gobo apertures 112 that is formed on the end of the exterior surface of the transparent shell 111 that is formed in what would commonly be referred to as the top of a light bulb formed by the transparent shell 111. The first gobo aperture 121 comprises a first negative gobo space 131 and a first plurality of gobo tabs 141.

The first negative gobo space 131 is the non-Euclidean disk-shaped negative space formed within the transparent shell 111 to create the first gobo aperture 121. The first plurality of gobo tabs 141 is a solid structure that projects into the interior of the negative disk space formed by the first negative gobo space 131. The first plurality of gobo tabs 141 is sized to receive the first plurality of gobo slots 251 formed in the first gobo stencil 211 of the first gobo insert 201. The first plurality of gobo tabs 141 forms a known and documented structure that is defined elsewhere in this disclosure.

The second gobo aperture 122 is a gobo aperture selected from the plurality of gobo apertures 112 that is formed in the exterior surface of the transparent shell 111. The second gobo aperture 122 comprises a second negative gobo space 132 and a second plurality of gobo tabs 142. The direction of the projected image 104 from the light that passes through the first gobo aperture 121 is perpendicular to the direction of the projected image 104 from the light that passes through the second gobo aperture 122.

The second negative gobo space 132 is the non-Euclidean disk-shaped negative space formed within the transparent shell 111 to create the second gobo aperture 122. The second plurality of gobo tabs 142 is a solid structure that projects into the interior of the negative disk space formed by the second negative gobo space 132. The second plurality of gobo tabs 142 is sized to receive the second plurality of gobo slots 252 formed in the second gobo stencil 212 of the second gobo insert 202. The second plurality of gobo tabs 142 forms a known and documented structure that is defined elsewhere in this disclosure.

The third gobo aperture 123 is a gobo aperture selected from the plurality of gobo apertures 112 that is formed in the exterior surface of the transparent shell 111. The direction of the projected image 104 from the light that passes through the first gobo aperture 121 is perpendicular to the direction of the projected image 104 from the light that passes through the third gobo aperture 123. The third gobo aperture 123 comprises a third negative gobo space 133 and a third plurality of gobo tabs 143.

The third negative gobo space 133 is the non-Euclidean disk-shaped negative space formed within the transparent shell 111 to create the third gobo aperture 123. The third plurality of gobo tabs 143 is a solid structure that projects into the interior of the negative disk space formed by the third negative gobo space 133. The third plurality of gobo tabs 143 is sized to receive the third plurality of gobo slots 253 formed in the third gobo stencil 213 of the third gobo insert 203. The third plurality of gobo tabs 143 forms a known and documented structure that is defined elsewhere in this disclosure.

The fourth gobo aperture 124 is a gobo aperture selected from the plurality of gobo apertures 112 that is formed in the exterior surface of the transparent shell 111. The fourth gobo aperture 124 is diametrically opposed to the second gobo aperture 122. The direction of the projected image 104 from the light that passes through the first gobo aperture 121 is perpendicular to the direction of the projected image 104 from the light that passes through the fourth gobo aperture 124. The fourth gobo aperture 124 comprises a fourth negative gobo space 134 and a fourth plurality of gobo tabs 144.

The fourth negative gobo space 134 is the non-Euclidean disk-shaped negative space formed within the transparent shell 111 to create the fourth gobo aperture 124. The fourth plurality of gobo tabs 144 is a solid structure that projects into the interior of the negative disk space formed by the fourth negative gobo space 134. The fourth plurality of gobo tabs 144 is sized to receive the fourth plurality of gobo slots 254 formed in the fourth gobo stencil 214 of the fourth gobo insert 204. The fourth plurality of gobo tabs 144 forms a known and documented structure that is defined elsewhere in this disclosure.

The fifth gobo aperture 125 is a gobo aperture selected from the plurality of gobo apertures 112 that is formed in the exterior surface of the transparent shell 111. The fifth gobo aperture 125 is diametrically opposed to the second gobo aperture 122. The direction of the projected image 104 from the light that passes through the first gobo aperture 121 is perpendicular to the direction of the projected image 104 from the light that passes through the fifth gobo aperture 125. The fifth gobo aperture 125 comprises a fifth negative gobo space 135 and a fifth plurality of gobo tabs 145.

The fifth negative gobo space 135 is the non-Euclidean disk-shaped negative space formed within the transparent shell 111 to create the fifth gobo aperture 125. The fifth plurality of gobo tabs 145 is a solid structure that projects into the interior of the negative disk space formed by the fifth negative gobo space 135. The fifth plurality of gobo tabs 145 is sized to receive the fifth plurality of gobo slots 255 formed in the fifth gobo stencil 215 of the fifth gobo insert 205. The fifth plurality of gobo tabs 145 forms a known and documented structure that is defined elsewhere in this disclosure.

Each of the plurality of gobos 102 is an optical device. Each gobo selected from the plurality of gobos 102 receives, redirects, and modifies light generated by the illuminating circuit 103 such that an image 104 associated with the selected gobo is visibly projected onto a surface. Each gobo selected from the plurality of gobos 102 mounts on the transparent housing 101. Specifically, each gobo selected from the plurality of gobos 102 inserts into a gobo aperture selected from the plurality of gobo apertures 112 formed in the transparent housing 101. The plurality of gobos 102 comprises a first gobo insert 201, a second gobo insert 202, a third gobo insert 203, a fourth gobo insert 204, and a fifth gobo insert 205.

The first gobo insert 201 is an optical structure. The first gobo insert 201 inserts into the first gobo aperture 121 of the plurality of gobo apertures 112 of the transparent housing 101. The first gobo insert 201 receives, redirects, and modifies light generated by the illuminating circuit 103 such that the first gobo image 241 associated with the first gobo insert 201 is visibly projected onto a surface. The first gobo insert 201 comprises a first gobo stencil 211 and a first gobo lens 221.

The first gobo stencil 211 forms the primary mechanical structure of the first gobo insert 201. The first gobo stencil 211 forms a transparent structure that inserts into the first gobo aperture 121. The first gobo stencil 211 contains the stencil that forms the image 104 projected from the first gobo insert 201. The first gobo lens 221 mounts into the first gobo stencil 211. The first gobo stencil 211 comprises a first gobo shell 231, a first gobo image 241, a first plurality of gobo slots 251, and a first lens mount 261.

The first gobo shell 231 is a non-Euclidean disk-shaped structure. The first gobo shell 231 inserts into the first gobo aperture 121 of the plurality of gobo apertures 112 to attach the first gobo insert 201 to the transparent shell 111 of the transparent housing 101. The first gobo image 241 is an opaque image 104 that is applied to the first gobo shell 231. The first gobo image 241 blocks the redirected light passing through the first gobo lens 221 such that the first gobo image 241 will physically form the image 104 projected by the first gobo insert 201. The first plurality of gobo slots 251 comprises the plurality of slots that are configured to interlock with the first plurality of gobo tabs 141 such that the first gobo insert 201 securely mounts in the first gobo aperture 121 of the transparent housing 101.

The first lens mount 261 is a mechanical structure formed in the first gobo stencil 211. The first gobo lens 221 mounts in the first lens mount 261 to form the first gobo insert 201. The first lens mount 261 is positioned within the first gobo stencil 211 such that the light redirected by the first gobo lens 221 passes through the first gobo image 241 to form the first gobo image 241 on a surface. The first gobo lens 221 is an optical lens that forms the optically active structure of the first gobo insert 201. The first gobo lens 221 mounts into the first gobo stencil 211. The first gobo lens 221 receives and redirects the light generated by the illuminating circuit 103 such that the redirected light passes through the first gobo image 241 which in turn modifies the light such that the first gobo insert 201 projects the first gobo image 241 onto a surface.

The second gobo insert 202 is an optical structure. The second gobo insert 202 inserts into the second gobo aperture 122 of the plurality of gobo apertures 112 of the transparent housing 101. The second gobo insert 202 receives, redirects, and modifies light generated by the illuminating circuit 103 such that the second gobo image 242 associated with the second gobo insert 202 is visibly projected onto a surface. The second gobo insert 202 comprises a second gobo stencil 212 and a second gobo lens 222.

The second gobo stencil 212 forms the primary mechanical structure of the second gobo insert 202. The second gobo stencil 212 forms a transparent structure that inserts into the second gobo aperture 122. The second gobo stencil 212 contains the stencil that forms the image 104 projected from the second gobo insert 202. The second gobo lens 222 mounts into the second gobo stencil 212. The second gobo stencil 212 comprises a second gobo shell 232, a second gobo image 242, a second plurality of gobo slots 252, and a second lens mount 262.

The second gobo shell 232 is a non-Euclidean disk-shaped structure. The second gobo shell 232 inserts into the second gobo aperture 122 of the plurality of gobo apertures 112 to attach the second gobo insert 202 to the transparent shell 111 of the transparent housing 101. The second gobo image 242 is an opaque image 104 that is applied to the second gobo shell 232. The second gobo image 242 blocks the redirected light passing through the second gobo lens 222 such that the second gobo image 242 will physically form the image 104 projected by the second gobo insert 202. The second plurality of gobo slots 252 comprises the plurality of slots that are configured to interlock with the second plurality of gobo tabs 142 such that the second gobo insert 202 securely mounts in the second gobo aperture 122 of the transparent housing 101.

The second lens mount 262 is a mechanical structure formed in the second gobo stencil 212. The second gobo lens 222 mounts in the second lens mount 262 to form the second gobo insert 202. The second lens mount 262 is positioned within the second gobo stencil 212 such that the light redirected by the second gobo lens 222 passes through the second gobo image 242 to form the second gobo image 242 on a surface. The second gobo lens 222 is an optical lens that forms the optically active structure of the second gobo insert 202. The second gobo lens 222 mounts into the second gobo stencil 212. The second gobo lens 222 receives and redirects the light generated by the illuminating circuit 103 such that the redirected light passes through the second gobo image 242 which in turn modifies the light such that the second gobo insert 202 projects the second gobo image 242 onto a surface.

The third gobo insert 203 is an optical structure. The third gobo insert 203 inserts into the third gobo aperture 123 of the plurality of gobo apertures 112 of the transparent housing 101. The third gobo insert 203 receives, redirects, and modifies light generated by the illuminating circuit 103 such that the third gobo image 243 associated with the third gobo insert 203 is visibly projected onto a surface. The third gobo insert 203 comprises a third gobo stencil 213 and a third gobo lens 223.

The third gobo stencil 213 forms the primary mechanical structure of the third gobo insert 203. The third gobo stencil 213 forms a transparent structure that inserts into the third gobo aperture 123. The third gobo stencil 213 contains the stencil that forms the image 104 projected from the third gobo insert 203. The third gobo lens 223 mounts into the third gobo stencil 213. The third gobo stencil 213 comprises a third gobo shell 233, a third gobo image 243, a third plurality of gobo slots 253, and a third lens mount 263.

The third gobo shell 233 is a non-Euclidean disk-shaped structure. The third gobo shell 233 inserts into the third gobo aperture 123 of the plurality of gobo apertures 112 to attach the third gobo insert 203 to the transparent shell 111 of the transparent housing 101. The third gobo image 243 is an opaque image 104 that is applied to the third gobo shell 233.

The third gobo image 243 blocks the redirected light passing through the third gobo lens 223 such that the third gobo image 243 will physically form the image 104 projected by the third gobo insert 203. The third plurality of gobo slots 253 comprises the plurality of slots that are configured to interlock with the third plurality of gobo tabs 143 such that the third gobo insert 203 securely mounts in the third gobo aperture 123 of the transparent housing 101.

The third lens mount 263 is a mechanical structure formed in the third gobo stencil 213. The third gobo lens 223 mounts in the third lens mount 263 to form the third gobo insert 203. The third lens mount 263 is positioned within the third gobo stencil 213 such that the light redirected by the third gobo lens 223 passes through the third gobo image 243 to form the third gobo image 243 on a surface. The third gobo lens 223 is an optical lens that forms the optically active structure of the third gobo insert 203. The third gobo lens 223 mounts into the third gobo stencil 213. The third gobo lens 223 receives and redirects the light generated by the illuminating circuit 103 such that the redirected light passes through the third gobo image 243 which in turn modifies the light such that the third gobo insert 203 projects the third gobo image 243 onto a surface.

The fourth gobo insert 204 is an optical structure. The fourth gobo insert 204 inserts into the fourth gobo aperture 124 of the plurality of gobo apertures 112 of the transparent housing 101. The fourth gobo insert 204 receives, redirects, and modifies light generated by the illuminating circuit 103 such that the fourth gobo image 244 associated with the fourth gobo insert 204 is visibly projected onto a surface. The fourth gobo insert 204 comprises a fourth gobo stencil 214 and a fourth gobo lens 224.

The fourth gobo stencil 214 forms the primary mechanical structure of the fourth gobo insert 204. The fourth gobo stencil 214 forms a transparent structure that inserts into the fourth gobo aperture 124. The fourth gobo stencil 214 contains the stencil that forms the image 104 projected from the fourth gobo insert 204. The fourth gobo lens 224 mounts into the fourth gobo stencil 214. The fourth gobo stencil 214 comprises a fourth gobo shell 234, a fourth gobo image 244, a fourth plurality of gobo slots 254, and a fourth lens mount 264.

The fourth gobo shell 234 is a non-Euclidean disk-shaped structure. The fourth gobo shell 234 inserts into the fourth gobo aperture 124 of the plurality of gobo apertures 112 to attach the fourth gobo insert 204 to the transparent shell 111 of the transparent housing 101. The fourth gobo image 244 is an opaque image 104 that is applied to the fourth gobo shell 234. The fourth gobo image 244 blocks the redirected light passing through the fourth gobo lens 224 such that the fourth gobo image 244 will physically form the image 104 projected by the fourth gobo insert 204. The fourth plurality of gobo slots 254 comprises the plurality of slots that are configured to interlock with the fourth plurality of gobo tabs 144 such that the fourth gobo insert 204 securely mounts in the fourth gobo aperture 124 of the transparent housing 101.

The fourth lens mount 264 is a mechanical structure formed in the fourth gobo stencil 214. The fourth gobo lens 224 mounts in the fourth lens mount 264 to form the fourth gobo insert 204. The fourth lens mount 264 is positioned within the fourth gobo stencil 214 such that the light redirected by the fourth gobo lens 224 passes through the fourth gobo image 244 to form the fourth gobo image 244 on a surface. The fourth gobo lens 224 is an optical lens that forms the optically active structure of the fourth gobo insert 204. The fourth gobo lens 224 mounts into the fourth gobo stencil 214. The fourth gobo lens 224 receives and redirects the light generated by the illuminating circuit 103 such that the redirected light passes through the fourth gobo image 244 which in turn modifies the light such that the fourth gobo insert 204 projects the fourth gobo image 244 onto a surface.

The fifth gobo insert 205 is an optical structure. The fifth gobo insert 205 inserts into the fifth gobo aperture 125 of the plurality of gobo apertures 112 of the transparent housing 101. The fifth gobo insert 205 receives, redirects, and modifies light generated by the illuminating circuit 103 such that the fifth gobo image 245 associated with the fifth gobo insert 205 is visibly projected onto a surface. The fifth gobo insert 205 comprises a fifth gobo stencil 215 and a fifth gobo lens 225.

The fifth gobo stencil 215 forms the primary mechanical structure of the fifth gobo insert 205. The fifth gobo stencil 215 forms a transparent structure that inserts into the fifth gobo aperture 125. The fifth gobo stencil 215 contains the stencil that forms the image 104 projected from the fifth gobo insert 205. The fifth gobo lens 225 mounts into the fifth gobo stencil 215. The fifth gobo stencil 215 comprises a fifth gobo shell 235, a fifth gobo image 245, a fifth plurality of gobo slots 255, and a fifth lens mount 265.

The fifth gobo shell 235 is a non-Euclidean disk-shaped structure. The fifth gobo shell 235 inserts into the fifth gobo aperture 125 of the plurality of gobo apertures 112 to attach the fifth gobo insert 205 to the transparent shell 111 of the transparent housing 101. The fifth gobo image 245 is an opaque image 104 that is applied to the fifth gobo shell 235. The fifth gobo image 245 blocks the redirected light passing through the fifth gobo lens 225 such that the fifth gobo image 245 will physically form the image 104 projected by the fifth gobo insert 205. The fifth plurality of gobo slots 255 comprises the plurality of slots that are configured to interlock with the fifth plurality of gobo tabs 145 such that the fifth gobo insert 205 securely mounts in the fifth gobo aperture 125 of the transparent housing 101.

The fifth lens mount 265 is a mechanical structure formed in the fifth gobo stencil 215. The fifth gobo lens 225 mounts in the fifth lens mount 265 to form the fifth gobo insert 205. The fifth lens mount 265 is positioned within the fifth gobo stencil 215 such that the light redirected by the fifth gobo lens 225 passes through the fifth gobo image 245 to form the fifth gobo image 245 on a surface. The fifth gobo lens 225 is an optical lens that forms the optically active structure of the fifth gobo insert 205. The fifth gobo lens 225 mounts into the fifth gobo stencil 215. The fifth gobo lens 225 receives and redirects the light generated by the illuminating circuit 103 such that the redirected light passes through the fifth gobo image 245 which in turn modifies the light such that the fifth gobo insert 205 projects the fifth gobo image 245 onto a surface.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Edison Screw: As used in this disclosure, the Edison screw is an electrical connection commonly used to connect a light bulb to a lamp. The Edison screw is formed by an Edison socket and an Edison plug. The electrical connection is formed when the Edison plug screws into the Edison socket. The Edison plug screws into the Edison socket using a threaded connection. The Edison socket has the interior screw thread. The Edison plug has the exterior screw thread.

Field of Illumination: As used in this disclosure, a field of illumination refers to an area illuminated by electromagnetic radiation projected from an electrical device such as a lamp or transmission antenna.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Gobo: As used in this disclosure, a gobo is a structure that controls the pattern of light generated by a light source. The gobo is placed between the light source and a target surface. The gobo forms a stencil that blocks a portion of the light generated by the light source as the generated light passes through the gobo to the target surface thereby forming the pattern.

Housing: As used in this disclosure, a housing is a rigid structure that encloses and protects one or more devices.

Illumination: As used in this disclosure, light refers to electromagnetic radiation contained with an area. Illumination is a synonym for light, particularly in cases where a measure of the amount of visible electromagnetic radiation in a space is called for.

Image: As used in this disclosure, an image is an optical representation or reproduction of an indicia or of the appearance of something or someone.

Indicia: As used in this disclosure, the term indicia refers to a set of markings that identify a sentiment. See sentiment.

Lens: As used in this disclosure, a lens is a transparent substance through which light can pass. A lens may or may not be formed with curved surfaces that are used to concentrate or disperse the light that travels through the lens. A lens may also be used to change the apparent size of an image.

Lamp: As used in this disclosure, a lamp is a two-terminal electrical device that generates (typically visible spectrum) electromagnetic radiation.

Light: As used in this disclosure, a light is an electrical device that generates visible light to illuminate objects or an area.

Light Bulb: As used in this disclosure, a lightbulb is a two-terminal electrical device that generates visible light to illuminate objects so they can be seen.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Structure: As used in this disclosure, a non-Euclidean structure is a structure wherein an axis of the structure lies on a non-Euclidean plane.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Opaque: As used in this disclosure, opaque refers to an object or material that prevents the passage of radiation through the object or material.

Overlay: As used in this disclosure, an overlay refers to the placement of a second structure over a first structure such that a portion of the first structure is visible through the second structure.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Projector: As used in this disclosure, a projector is a device that uses light and a lens system to project an image on a surface.

Radial: As used in this disclosure, the term radial refers to a direction that: 1) is perpendicular to an identified central axis; or, 2) projects away from a center point.

Sentiment: As used in this disclosure, a sentiment refers to a symbolic meaning or message that is communicated through the use of an image, potentially including a text based image.

Shell: As used in this disclosure, a shell is a structure that forms an outer covering intended to contain an object. Shells are often, but not necessarily, rigid or semi-rigid structures that are intended to protect the object contained within it.

Stencil: As used in this disclosure, a stencil is a structure with one or more negatives spaces formed through it. The stencil is placed as an overlay on a surface. Once overlaid on the surface, the negative spaces of the boundaries allow for the application of paints, inks or other marking substances to be applied to the overlaid surface to create an image on the surface. Stencils configured for repeated use allows for the consistent application of the image on multiple surfaces.

Tabs and Slots: As used in this disclosure, the terms tabs and slots refer to structures formed in the lateral edges of a plurality of disk-shaped structures. The tabs and slots are used to interconnect the plurality of disk-shaped structures. A common example of the use of tabs and slots to interconnect a plurality of disk-shaped structures is a jigsaw puzzle. The tab refers to an irregularly shaped disk structure such that attaches to the lateral face of a second disk structure such that the tab and the disk structure combine to form an irregular disk shape. The slot is a negative space that forms an irregularly shaped disk structure within a solid disk structure. When interconnecting the plurality of disk-shaped structures, the tab of a first disk-shaped structure selected from the plurality of disk-shaped structures is geometrically similar to the slot of a second disk-shaped structure selected from the plurality of disk-shaped structures such that the tab inserts into the slot to attach the first disk-shaped structure to the second disk-shaped structure. The attachment of a tab to a slot is often referred to as interlocking.

Transparent: As used in this disclosure, transparent refers to a material that allows light to pass through the material without significant scattering such that an object can be clearly seen through the material.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A light guide comprising:
a transparent housing, a plurality of gobos, and an illuminating circuit;
wherein the illuminating circuit generates the illumination to project an image;
wherein the transparent housing is a transparent structure that encloses the illuminating circuit;
wherein the plurality of gobos attaches to the transparent housing wherein each gobo selected from the plurality of gobos inserts into a gobo aperture selected from a plurality of gobo apertures formed in the transparent housing;
wherein the light guide is a light bulb that is modified to project an image on a surface;
wherein the light guide is reconfigurable such that the image projected by the light guide can change.

2. The light guide according to claim 1
wherein each of the plurality of gobos contains an image;
wherein each of the plurality of gobos is an optical device that focuses and modifies the illumination generated by the illuminating circuit such that the light guide projects the image associated with each gobo attached to the transparent housing.

3. The light guide according to claim 2
wherein the illuminating circuit is an electrical circuit;
wherein the illuminating circuit generates the illumination that is used to project the image contained in each of the plurality of gobos.

4. The light guide according to claim 3
wherein the transparent housing is a hollow transparent structure;
wherein the transparent housing is a non-Euclidean structure;
wherein the transparent nature of the transparent housing is such that the illumination generated by the illuminating circuit passes through the transparent housing;
wherein the illumination generated by the illuminating circuit passes through the transparent housing and through the plurality of gobos to project the image associated with each of the plurality of gobos on a surface.

5. The light guide according to claim 4
wherein the transparent housing comprises a transparent shell and a plurality of gobo apertures;

wherein each of the plurality of gobo apertures is a negative space that is formed into the exterior surface of the transparent shell.

6. The light guide according to claim 5
wherein the transparent shell is a hollow non-Euclidean structure;
wherein the transparent shell is a transparent structure;
wherein the transparent shell forms the primary portions of the exterior surface of the transparent housing;
wherein the transparent shell encloses the illuminating circuit.

7. The light guide according to claim 6
wherein each of the plurality of gobo apertures is a non-Euclidean structure;
wherein each of the plurality of gobo apertures has a form factor that receives a gobo selected from the plurality of gobos;
wherein each of the plurality of gobo apertures has a non-Euclidean disk shape;
wherein each gobo selected from the plurality of gobos removably attaches to a gobo aperture selected from the plurality of gobo apertures.

8. The light guide according to claim 7
wherein the plurality of gobo apertures comprises a first gobo aperture, a second gobo aperture, a third gobo aperture, a fourth gobo aperture, and a fifth gobo aperture;
wherein the first gobo aperture is a gobo aperture selected from the plurality of gobo apertures that is formed on the end of the exterior surface of the transparent shell that is formed in what is the top of a light bulb shape formed by the transparent shell;
wherein the second gobo aperture is a gobo aperture selected from the plurality of gobo apertures that is formed in the exterior surface of the transparent shell;
wherein the direction of the projected image from the light that passes through the first gobo aperture is perpendicular to the direction of the projected image from the light that passes through the second gobo aperture;
wherein the third gobo aperture is a gobo aperture selected from the plurality of gobo apertures that is formed in the exterior surface of the transparent shell;
wherein the direction of the projected image from the light that passes through the first gobo aperture is perpendicular to the direction of the projected image from the light that passes through the third gobo aperture;
wherein the fourth gobo aperture is a gobo aperture selected from the plurality of gobo apertures that is formed in the exterior surface of the transparent shell;
wherein the fourth gobo aperture is diametrically opposed to the second gobo aperture;
wherein the direction of the projected image from the light that passes through the first gobo aperture is perpendicular to the direction of the projected image from the light that passes through the fourth gobo aperture;
wherein the fifth gobo aperture is a gobo aperture selected from the plurality of gobo apertures that is formed in the exterior surface of the transparent shell;
wherein the fifth gobo aperture is diametrically opposed to the second gobo aperture;
wherein the direction of the projected image from the light that passes through the first gobo aperture is perpendicular to the direction of the projected image from the light that passes through the fifth gobo aperture.

9. The light guide according to claim 8
wherein the first gobo aperture comprises a first negative gobo space and a first plurality of gobo tabs;
wherein the first negative gobo space is the non-Euclidean disk-shaped negative space formed within the transparent shell to create the first gobo aperture;
wherein the first plurality of gobo tabs is a solid structure that projects into the interior of the negative disk space formed by the first negative gobo space.

10. The light guide according to claim 9
wherein the second gobo aperture comprises a second negative gobo space and a second plurality of gobo tabs;
wherein the second negative gobo space is the non-Euclidean disk-shaped negative space formed within the transparent shell to create the second gobo aperture;
wherein the second plurality of gobo tabs is a solid structure that projects into the interior of the negative disk space formed by the second negative gobo space.

11. The light guide according to claim 10
wherein the third gobo aperture comprises a third negative gobo space and a third plurality of gobo tabs;
wherein the third negative gobo space is the non-Euclidean disk-shaped negative space formed within the transparent shell to create the third gobo aperture;
wherein the third plurality of gobo tabs is a solid structure that projects into the interior of the negative disk space formed by the third negative gobo space.

12. The light guide according to claim 11
wherein the fourth gobo aperture comprises a fourth negative gobo space and a fourth plurality of gobo tabs;
wherein the fourth negative gobo space is the non-Euclidean disk-shaped negative space formed within the transparent shell to create the fourth gobo aperture;
wherein the fourth plurality of gobo tabs is a solid structure that projects into the interior of the negative disk space formed by the fourth negative gobo space.

13. The light guide according to claim 12
wherein the fifth gobo aperture comprises a fifth negative gobo space and a fifth plurality of gobo tabs;
wherein the fifth negative gobo space is the non-Euclidean disk-shaped negative space formed within the transparent shell to create the fifth gobo aperture;
wherein the fifth plurality of gobo tabs is a solid structure that projects into the interior of the negative disk space formed by the fifth negative gobo space.

14. The light guide according to claim 13
wherein the plurality of gobos comprises a first gobo insert, a second gobo insert, a third gobo insert, a fourth gobo insert, and a fifth gobo insert;
wherein the first gobo insert is an optical structure;
wherein the first gobo insert inserts into the first gobo aperture of the plurality of gobo apertures of the transparent housing;
wherein the first gobo insert receives, redirects, and modifies light generated by the illuminating circuit such that the first gobo image associated with the first gobo insert is visibly projected onto a surface;
wherein the second gobo insert is an optical structure;
wherein the second gobo insert inserts into the second gobo aperture of the plurality of gobo apertures of the transparent housing;
wherein the second gobo insert receives, redirects, and modifies light generated by the illuminating circuit such that the second gobo image associated with the second gobo insert is visibly projected onto a surface;

wherein the third gobo insert is an optical structure;

wherein the third gobo insert inserts into the third gobo aperture of the plurality of gobo apertures of the transparent housing;

wherein the third gobo insert receives, redirects, and modifies light generated by the illuminating circuit such that the third gobo image associated with the third gobo insert is visibly projected onto a surface;

wherein the fourth gobo insert is an optical structure;

wherein the fourth gobo insert inserts into the fourth gobo aperture of the plurality of gobo apertures of the transparent housing;

wherein the fourth gobo insert receives, redirects, and modifies light generated by the illuminating circuit such that the fourth gobo image associated with the fourth gobo insert is visibly projected onto a surface;

wherein the fifth gobo insert is an optical structure;

wherein the fifth gobo insert inserts into the fifth gobo aperture of the plurality of gobo apertures of the transparent housing;

wherein the fifth gobo insert receives, redirects, and modifies light generated by the illuminating circuit such that the fifth gobo image associated with the fifth gobo insert is visibly projected onto a surface.

15. The light guide according to claim 14 wherein the first gobo insert comprises a first gobo stencil and a first gobo lens;

wherein the first gobo stencil forms the primary mechanical structure of the first gobo insert;

wherein the first gobo stencil forms a transparent structure that inserts into the first gobo aperture;

wherein the first gobo stencil contains the stencil that forms the image projected from the first gobo insert;

wherein the first gobo lens is an optical lens that forms the optically active structure of the first gobo insert;

wherein the first gobo lens mounts into the first gobo stencil;

wherein the second gobo insert comprises a second gobo stencil and a second gobo lens;

wherein the second gobo stencil forms the primary mechanical structure of the second gobo insert;

wherein the second gobo stencil forms a transparent structure that inserts into the second gobo aperture;

wherein the second gobo stencil contains the stencil that forms the image projected from the second gobo insert;

wherein the second gobo lens mounts into the second gobo stencil;

wherein the third gobo insert comprises a third gobo stencil and a third gobo lens;

wherein the third gobo stencil forms the primary mechanical structure of the third gobo insert;

wherein the third gobo stencil forms a transparent structure that inserts into the third gobo aperture;

wherein the third gobo stencil contains the stencil that forms the image projected from the third gobo insert;

wherein the third gobo lens is an optical lens that forms the optically active structure of the third gobo insert;

wherein the third gobo lens mounts into the third gobo stencil;

wherein the fourth gobo insert comprises a fourth gobo stencil and a fourth gobo lens;

wherein the fourth gobo stencil forms the primary mechanical structure of the fourth gobo insert;

wherein the fourth gobo stencil forms a transparent structure that inserts into the fourth gobo aperture;

wherein the fourth gobo stencil contains the stencil that forms the image projected from the fourth gobo insert;

wherein the fourth gobo lens is an optical lens that forms the optically active structure of the fourth gobo insert;

wherein the fourth gobo lens mounts into the fourth gobo stencil;

wherein the fifth gobo insert comprises a fifth gobo stencil and a fifth gobo lens;

wherein the fifth gobo stencil forms the primary mechanical structure of the fifth gobo insert;

wherein the fifth gobo stencil forms a transparent structure that inserts into the fifth gobo aperture;

wherein the fifth gobo stencil contains the stencil that forms the image projected from the fifth gobo insert;

wherein the fifth gobo lens is an optical lens that forms the optically active structure of the fifth gobo insert;

wherein the fifth gobo lens mounts into the fifth gobo stencil.

16. The light guide according to claim 15 wherein the first gobo stencil comprises a first gobo shell, a first gobo image, a first plurality of gobo slots, and a first lens mount;

wherein the first gobo shell is a non-Euclidean disk-shaped structure;

wherein the first gobo shell inserts into the first gobo aperture of the plurality of gobo apertures to attach the first gobo insert to the transparent shell of the transparent housing;

wherein the first gobo image is an opaque image that is applied to the first gobo shell;

wherein the first gobo image blocks the redirected light passing through the first gobo lens such that the first gobo image will physically form the image projected by the first gobo insert;

wherein the first plurality of gobo slots comprises the plurality of slots that are configured to interlock with the first plurality of gobo tabs such that the first gobo insert securely mounts in the first gobo aperture of the transparent housing;

wherein the first lens mount is a mechanical structure formed in the first gobo stencil;

wherein the first gobo lens mounts in the first lens mount to form the first gobo insert;

wherein the first lens mount is positioned within the first gobo stencil such that the light redirected by the first gobo lens passes through the first gobo image to form the first gobo image on a surface;

wherein the second gobo stencil comprises a second gobo shell, a second gobo image, a second plurality of gobo slots, and a second lens mount;

wherein the second gobo shell is a non-Euclidean disk-shaped structure;

wherein the second gobo shell inserts into the second gobo aperture of the plurality of gobo apertures to attach the second gobo insert to the transparent shell of the transparent housing;

wherein the second gobo image is an opaque image that is applied to the second gobo shell;

wherein the second gobo image blocks the redirected light passing through the second gobo lens such that the second gobo image will physically form the image projected by the second gobo insert;

wherein the second plurality of gobo slots comprises the plurality of slots that are configured to interlock with the second plurality of gobo tabs such that the second gobo insert securely mounts in the second gobo aperture of the transparent housing;

wherein the second lens mount is a mechanical structure formed in the second gobo stencil;

wherein the second gobo lens mounts in the second lens mount to form the second gobo insert;

wherein the second lens mount is positioned within the second gobo stencil such that the light redirected by the second gobo lens passes through the second gobo image to form the second gobo image on a surface;

wherein the second gobo lens is an optical lens that forms the optically active structure of the second gobo insert;

wherein the second gobo lens mounts into the second gobo stencil;

wherein the third gobo stencil comprises a third gobo shell, a third gobo image, a third plurality of gobo slots, and a third lens mount;

wherein the third gobo shell is a non-Euclidean disk-shaped structure;

wherein the third gobo shell inserts into the third gobo aperture of the plurality of gobo apertures to attach the third gobo insert to the transparent shell of the transparent housing;

wherein the third gobo image is an opaque image that is applied to the third gobo shell;

wherein the third gobo image blocks the redirected light passing through the third gobo lens such that the third gobo image will physically form the image projected by the third gobo insert;

wherein the third plurality of gobo slots comprises the plurality of slots that are configured to interlock with the third plurality of gobo tabs such that the third gobo insert securely mounts in the third gobo aperture of the transparent housing;

wherein the third lens mount is a mechanical structure formed in the third gobo stencil;

wherein the third gobo lens mounts in the third lens mount to form the third gobo insert;

wherein the third lens mount is positioned within the third gobo stencil such that the light redirected by the third gobo lens passes through the third gobo image to form the third gobo image on a surface;

wherein the fourth gobo stencil comprises a fourth gobo shell, a fourth gobo image, a fourth plurality of gobo slots, and a fourth lens mount;

wherein the fourth gobo shell is a non-Euclidean disk-shaped structure;

wherein the fourth gobo shell inserts into the fourth gobo aperture of the plurality of gobo apertures to attach the fourth gobo insert to the transparent shell of the transparent housing;

wherein the fourth gobo image is an opaque image that is applied to the fourth gobo shell;

wherein the fourth gobo image blocks the redirected light passing through the fourth gobo lens such that the fourth gobo image will physically form the image projected by the fourth gobo insert;

wherein the fourth plurality of gobo slots comprises the plurality of slots that are configured to interlock with the fourth plurality of gobo tabs such that the fourth gobo insert securely mounts in the fourth gobo aperture of the transparent housing;

wherein the fourth lens mount is a mechanical structure formed in the fourth gobo stencil;

wherein the fourth gobo lens mounts in the fourth lens mount to form the fourth gobo insert;

wherein the fourth lens mount is positioned within the fourth gobo stencil such that the light redirected by the fourth gobo lens passes through the fourth gobo image to form the fourth gobo image on a surface;

wherein the fifth gobo stencil comprises a fifth gobo shell, a fifth gobo image, a fifth plurality of gobo slots, and a fifth lens mount;

wherein the fifth gobo shell is a non-Euclidean disk-shaped structure;

wherein the fifth gobo shell inserts into the fifth gobo aperture of the plurality of gobo apertures to attach the fifth gobo insert to the transparent shell of the transparent housing;

wherein the fifth gobo image is an opaque image that is applied to the fifth gobo shell;

wherein the fifth gobo image blocks the redirected light passing through the fifth gobo lens such that the fifth gobo image will physically form the image projected by the fifth gobo insert;

wherein the fifth plurality of gobo slots comprises the plurality of slots that are configured to interlock with the fifth plurality of gobo tabs such that the fifth gobo insert securely mounts in the fifth gobo aperture of the transparent housing;

wherein the fifth lens mount is a mechanical structure formed in the fifth gobo stencil;

wherein the fifth gobo lens mounts in the fifth lens mount to form the fifth gobo insert;

wherein the fifth lens mount is positioned within the fifth gobo stencil such that the light redirected by the fifth gobo lens passes through the fifth gobo image to form the fifth gobo image on a surface.

17. The light guide according to claim 16 wherein the first gobo lens receives and redirects the light generated by the illuminating circuit such that the redirected light passes through the first gobo image which in turn modifies the light such that the first gobo insert projects the first gobo image onto a surface;

wherein the second gobo lens receives and redirects the light generated by the illuminating circuit such that the redirected light passes through the second gobo image which in turn modifies the light such that the second gobo insert projects the second gobo image onto a surface;

wherein the third gobo lens receives and redirects the light generated by the illuminating circuit such that the redirected light passes through the third gobo image which in turn modifies the light such that the third gobo insert projects the third gobo image onto a surface;

wherein the fourth gobo lens receives and redirects the light generated by the illuminating circuit such that the redirected light passes through the fourth gobo image which in turn modifies the light such that the fourth gobo insert projects the fourth gobo image onto a surface;

wherein the fifth gobo lens receives and redirects the light generated by the illuminating circuit such that the redirected light passes through the fifth gobo image which in turn modifies the light such that the fifth gobo insert projects the fifth gobo image onto a surface.

18. The light guide according to claim 17 wherein the first plurality of gobo tabs are sized to receive the first plurality of gobo slots formed in the first gobo stencil of the first gobo insert;

wherein the second plurality of gobo tabs are sized to receive the second plurality of gobo slots formed in the second gobo stencil of the second gobo insert;

wherein the third plurality of gobo tabs are sized to receive the third plurality of gobo slots formed in the third gobo stencil of the third gobo insert;

wherein the fourth plurality of gobo tabs are sized to receive the fourth plurality of gobo slots formed in the fourth gobo stencil of the fourth gobo insert;

wherein the fifth plurality of gobo tabs are sized to receive the fifth plurality of gobo slots formed in the fifth gobo stencil of the fifth gobo insert.

\* \* \* \* \*